US011200520B2

(12) United States Patent
Nagata et al.

(10) Patent No.: US 11,200,520 B2
(45) Date of Patent: Dec. 14, 2021

(54) INDUSTRIAL EQUIPMENT PRODUCTION SYSTEM, INDUSTRIAL EQUIPMENT PRODUCTION METHOD, AND INFORMATION STORAGE MEDIUM

(71) Applicant: Kabushiki Kaisha Yaskawa Denki, Kitakyushu (JP)

(72) Inventors: Takeshi Nagata, Kitakyushu (JP); Tadashi Okubo, Kitakyushu (JP); Yusuke Oka, Kitakyushu (JP); Jiro Muraoka, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 492 days.

(21) Appl. No.: 15/361,071

(22) Filed: Nov. 24, 2016

(65) Prior Publication Data

US 2017/0075342 A1 Mar. 16, 2017

Related U.S. Application Data (63) Continuation of application No. PCT/JP2014/066485, filed on Jun. 20, 2014.

(51) Int. Cl.
*G06Q 10/06* (2012.01)
*G05B 19/418* (2006.01)
*G06Q 30/06* (2012.01)

(52) U.S. Cl.
CPC ....... *G06Q 10/0631* (2013.01); *G05B 19/418* (2013.01); *G06Q 10/06315* (2013.01); *G06Q 30/0607* (2013.01)

(58) Field of Classification Search
None
See application file for complete search history.

(56) References Cited

U.S. PATENT DOCUMENTS

2002/0065572 A1 5/2002 Ina et al.
2005/0144620 A1 6/2005 Hada et al.
(Continued)

FOREIGN PATENT DOCUMENTS

CN 102779300 A 11/2012
CN 102855571 A 1/2013
(Continued)

OTHER PUBLICATIONS

Forza, "Supporting product configuration and form postponement by grouping components into kits: the case of MarelliMotori," 2006, Int. J. Mass Customisation, vol. 1, No. 4, pp. 427-444 (Year: 2006).*

(Continued)

*Primary Examiner* — Ivan R Goldberg
(74) *Attorney, Agent, or Firm* — HEA Law PLLC (57) ABSTRACT

Provided is an industrial equipment production system, including: a production propriety acquisition unit configured to acquire a determination result indicating whether or not industrial equipment is producible by using setting information regarding the industrial equipment based on equipment information regarding the industrial equipment; a supply propriety acquisition unit configured to acquire, based on user information regarding a user, a determination result indicating whether or not the industrial equipment produced by using the setting information is suppliable to the user; and a permission unit configured to permit the production of the industrial equipment that uses the setting information based on the determination result acquired by the production propriety acquisition unit and the determination result acquired by the supply propriety acquisition unit.

7 Claims, 8 Drawing Sheets

(56) References Cited

U.S. PATENT DOCUMENTS

| | | | |
|---|---|---|---|
| 2005/0209720 A1 | 9/2005 | Ina et al. | |
| 2008/0109329 A1* | 5/2008 | Fichtinger | G06Q 10/06 705/29 |
| 2008/0197797 A1* | 8/2008 | El-Ibiary | H02P 5/00 318/567 |
| 2009/0088883 A1* | 4/2009 | Baier | G06T 7/001 700/110 |
| 2009/0204267 A1* | 8/2009 | Sustaeta | G06Q 10/04 700/291 |
| 2010/0076575 A1* | 3/2010 | Vasko | G05B 19/41845 700/81 |
| 2011/0119479 A1 | 5/2011 | Cowie et al. | |
| 2011/0241447 A1 | 10/2011 | Ando et al. | |
| 2012/0083906 A1* | 4/2012 | Weatherhead | G05B 23/0267 700/83 |
| 2012/0290104 A1* | 11/2012 | Holt | G06Q 10/00 700/29 |
| 2013/0211546 A1* | 8/2013 | Lawson | G05B 19/0426 700/9 |
| 2014/0095352 A1* | 4/2014 | Woodall | G06Q 30/0609 705/26.35 |
| 2015/0077955 A1* | 3/2015 | Tio | H05K 7/1432 361/752 |
| 2015/0112886 A1 | 4/2015 | Luan et al. | |

FOREIGN PATENT DOCUMENTS

| | | |
|---|---|---|
| CN | 103782312 A | 5/2014 |
| JP | 2002-163016 A | 6/2002 |
| JP | 2005-190068 A | 7/2005 |
| JP | 2011-197922 A | 10/2011 |
| JP | 2011-229359 A | 11/2011 |
| WO | 2012/144863 A2 | 10/2012 |
| WO | 2012144863 A2 | 10/2012 |

OTHER PUBLICATIONS

English Translation of International Search Report for PCT/JP2014/066485 dated Aug. 5, 2014.

Search Report dated Nov. 17, 2017, for corresponding EP Patent Application No. 14895062.9.

Office Action dated Nov. 20, 2018, for corresponding CN Patent ApplicationNo.201480080024.0 and English translation thereof.

Decesion to Refuse dated Oct. 6, 2020, for corresponding EP Patent Application No. 14895062.9 p. 1 to p. 50.

Office Action dated Jun. 24, 2021, for corresponding CN Patent Application No. 201480080024.0 with English translation pp. 1-9.

* cited by examiner

INDUSTRIAL EQUIPMENT PRODUCTION SYSTEM, INDUSTRIAL EQUIPMENT PRODUCTION METHOD, AND INFORMATION STORAGE MEDIUM

INCORPORATION BY REFERENCE

The present disclosure contains subject matter related to that disclosed in International Patent Application PCT/JP2014/066485 filed in the Japan Patent Office on Jun. 20, 2014, the entire contents of which are hereby incorporated by reference.

BACKGROUND OF THE INVENTION

Field of the Invention

The embodiments disclosed herein relates to an industrial equipment production system, an industrial equipment production method, and an information storage medium.

Description of the Related Art

In JP2011-229359A, there is described a system configured to enable a user to connect an engineering tool to industrial equipment produced by a maker to adjust setting information, e.g., a parameter, and to display various pieces of information, e.g., the setting information regarding the industrial equipment.

SUMMARY OF THE INVENTION

According to one embodiment of the present invention, there is provided an industrial equipment production system, including: a production propriety acquisition unit configured to acquire a determination result indicating whether or not industrial equipment is producible by using setting information regarding the industrial equipment based on equipment information regarding the industrial equipment; a supply propriety acquisition unit configured to acquire, based on user information regarding a user, a determination result indicating whether or not the industrial equipment produced by using the setting information is suppliable to the user; and a permission unit configured to permit the production of the industrial equipment that uses the setting information based on the determination result acquired by the production propriety acquisition unit and the determination result acquired by the supply propriety acquisition unit.

DESCRIPTION OF THE EMBODIMENTS

From the viewpoint of the inventors of the present invention, hitherto, a user needs to individually set setting information for industrial equipment, resulting in labor for setting desired setting information. In order to eliminate this labor, for example, it is conceivable to produce industrial equipment to which setting information regarding certain industrial equipment is set in advance. However, as a problem specific to the field of the industrial equipment, this type of production may not be preferred for industrial equipment to be produced and a user.

As a result of extensive research and development of the permission of the production of the industrial equipment that uses the setting information regarding the industrial equipment while considering information unique to the industrial equipment and information regarding the user, a novel and original industrial equipment production system and the like have occurred to the inventors of the present invention. Now, a detailed description is given of this industrial equipment production system and the like through an embodiment thereof.

[Industrial Equipment Production System According to Embodiment of Present Invention]

Figure 1:
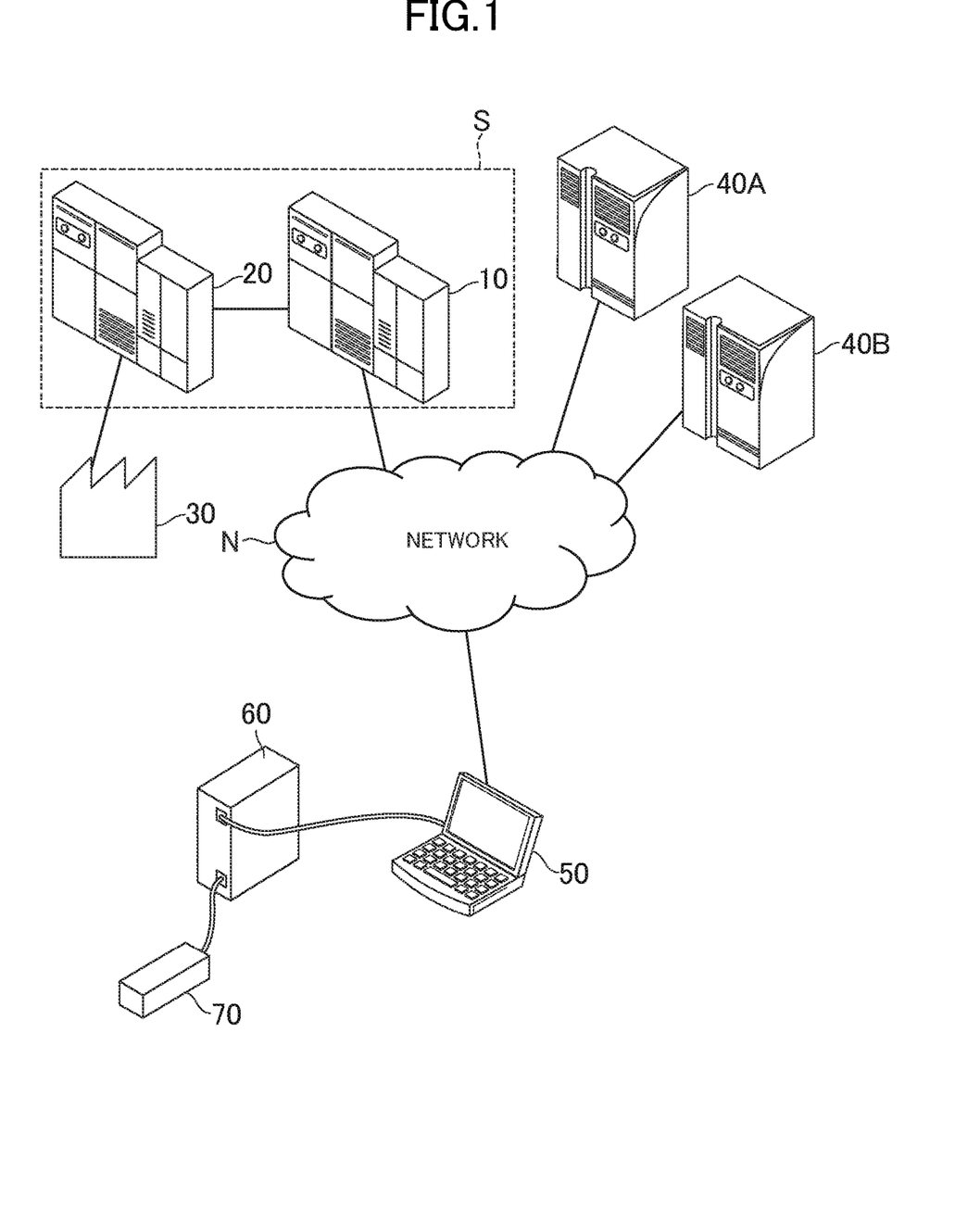
FIG. 1 is a diagram for illustrating an example of an overall configuration of an industrial equipment production system according to an embodiment of the present invention.

FIG. 1 is a diagram for illustrating an example of an overall configuration of an industrial equipment production system according to an embodiment of the present invention. As illustrated in FIG. 1, an industrial equipment production system S according to this embodiment includes a production permission server 10 and an equipment management server 20. The industrial equipment production system S is connected to each of a regional system 40 and a user device 50 via a network N so as to be capable of transmitting/receiving data.

Figure 2:
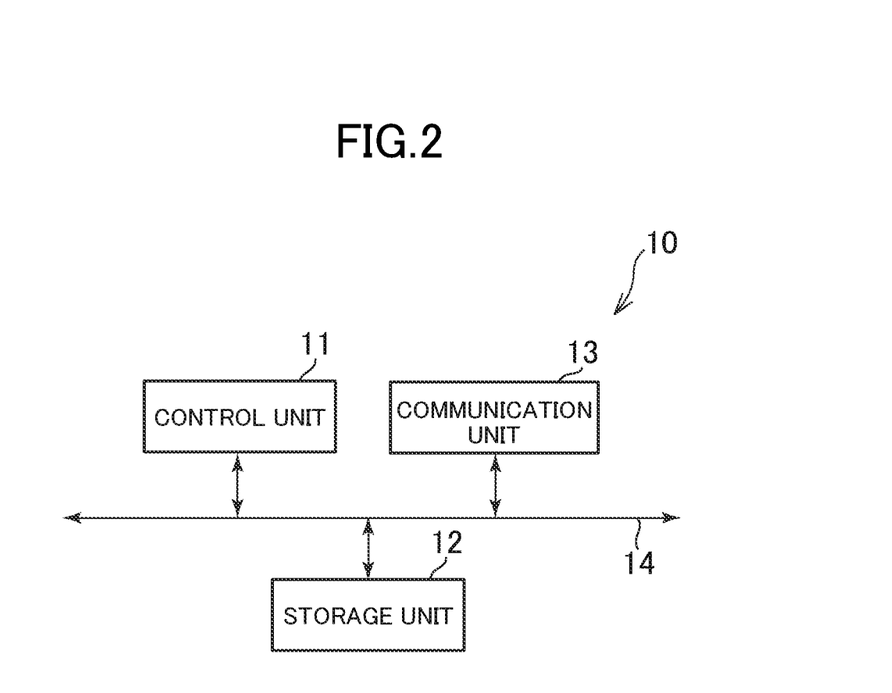
FIG. 2 is diagram for illustrating an example of a hardware configuration of a production permission server.

FIG. 2 is diagram for illustrating an example of a hardware configuration of the production permission server 10. The production permission server 10 is a general server computer, and includes a control unit 11, a storage unit 12, and a communication unit 13. The respective units are connected to each other via a bus 14. The control unit 11 includes one or a plurality of central processing units (CPUs). The storage unit 12 includes a main storage unit (e.g., volatile memory such as a DRAM) and an auxiliary storage unit (e.g., nonvolatile memory such as a hard disk), and is configured to store various programs and data. The control unit 11 is configured to carryout various pieces of processing based on those programs and data. The communication unit 13 includes a network card and various communication connectors, and is configured to communicate to/from other computers.

The equipment management server 20 is a general server computer, and includes a control unit, a storage unit, and a communication unit. The respective units are connected to each other via a bus. Those hardware configurations may be the same as those of the production permission server 10. The equipment management server 20 is configured to manage personal information regarding each user and various pieces of information regarding industrial equipment. The equipment management server 20 is configured to supply the information in response to a request from the outside, and supply firmware to the users. Further, the equipment management server 20 is connected to a plant system 30 configured to manage production of the industrial equipment, and is configured to supply various pieces of information to the plant system 30.

The regional system 40 includes a general server computer. The server computer includes a control unit, a storage unit, and a communication unit, and the respective units are connected to each other via a bus. Those hardware configurations may be the same as those of the production permission server 10. According to this embodiment, industrial equipment produced by a maker is available for supply in a plurality of regions, and the regional system 40 exists for each of the regions. The term "supply" means both charged supply (e.g., sale), and free supply (e.g., replacement). On this occasion, pieces of industrial equipment available for supply vary depending on the region. In other words, a lineup of pieces of industrial equipment available for supply differs depending on the region. For example, industrial equipment available for supply in a country A may not be available for supply in a country B due to a restriction by law, need of customers, and the like.

Each of the plurality of regional systems 40 manages various pieces of information regarding pieces of industrial equipment available for supply in a region corresponding to the regional system 40 out of pieces of industrial equipment available from the maker. For example, a regional system 40A corresponding to the country A manages industrial equipment available for supply in the country A. A regional system 40B corresponding to the country B manages industrial equipment available for supply in the country B. Each of the regional systems 40 only needs to have a management body different from those of the other regional systems 40, and the server computer does not always need to be installed in the region corresponding to the regional system 40. In other words, for example, the server computers for the regional systems 40A and 40B may be installed in the same region. In this case, the regional system 40A only needs to be placed under the management of a management body of the country A, and the regional system 40B only needs to be placed under the management of a management body of the country B.

The user device 50 is a general computer, e.g., a personal computer or a portable terminal. The user device 50 includes a control unit, a storage unit, and a communication unit, and the respective units are connected to each other via a bus. Those hardware configurations may be the same as those of the production permission server 10. The user device 50 may include a display unit, e.g., a liquid crystal display, and an operation unit, which is an input device, e.g., a mouse and a keyboard. Moreover, the user device 50 is connected to industrial equipment, e.g., a motor control device 60 configured to control a motor 70, and is used when the user carries out maintenance work for the motor control device 60.

The motor control device 60 includes a control unit (e.g., micro processing unit: MPU) and a storage unit (e.g., DRAM or EEPROM), and is configured to store setting information, e.g., parameters and firmware for controlling the motor 70. The user can use the user device 50 to adjust the setting information for the motor control device 60. The setting information may be able to be uploaded to the equipment management server 20 via the user device 50. In this case, the equipment management server 20 manages the setting information while associating the setting information with a serial number, which is individual identification information of the industrial equipment.

A two-dimensional code including the serial number as information may be assigned to the motor control device 60. In this case, the two-dimensional code may be printed on a housing of the motor control device 60, or a recoding medium (e.g., paper) on which the two-dimensional code is printed may be attached to the housing. In this case, the user device 50 includes a camera, and is configured to be able to apply image analysis to the two-dimensional code taken by the camera, thereby identifying a serial number and the like of the motor control device 60. Publicly known various methods can be applied as a method of reading the two-dimensional code itself.

Moreover, the programs and the respective pieces of data described as being stored in the storage units of the above-mentioned respective computers may be stored in computer-readable information storage media, or may be acquired from an external device via the network N. Further, the hardware configuration of each of the computers is not limited to the above-mentioned example, and hardware generally used may be applied. For example, each of the computers may include a reading unit for reading the information storage medium.

[Functions Implemented by Industrial Equipment Production System]

Figure 3:
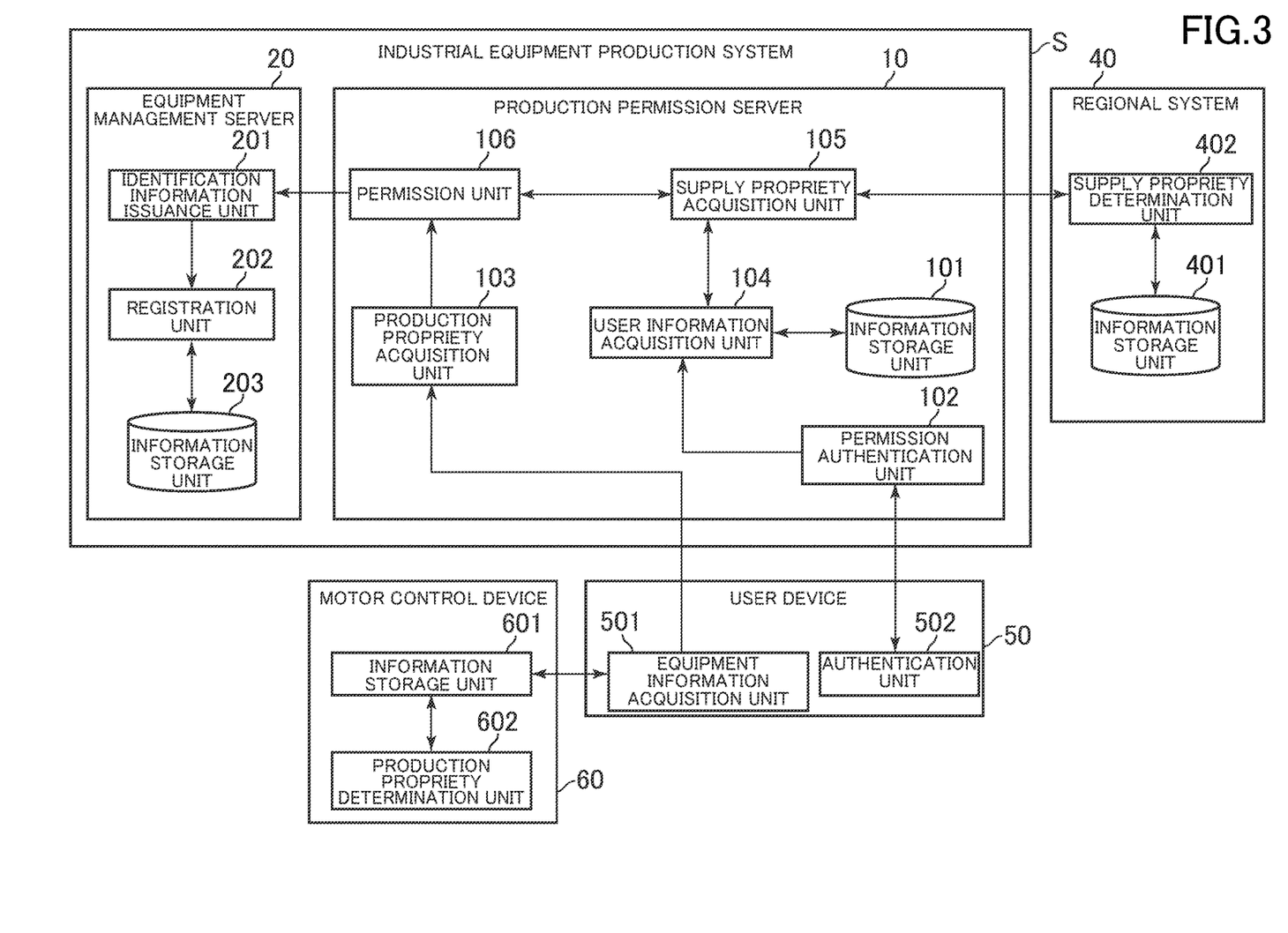
FIG. 3 is a functional block diagram for illustrating functions implemented in the embodiment of the present invention.

FIG. 3 is a functional block diagram for illustrating functions implemented in this embodiment. According to this embodiment, the motor control device 60 is described as an example of the industrial equipment, but the industrial equipment is not limited to the motor control device 60, and various pieces of industrial equipment may be applied. In the following, the description "motor control device" may be considered as each of various pieces of industrial equipment, e.g., a controller and an inverter.

[Functions Implemented by Motor Control Device]

The motor control device 60 includes an information storage unit 601 and a production propriety determination unit 602. The information storage unit 601 is implemented mainly by the storage unit of the motor control device 60. The information storage unit 601 stores various pieces of information (e.g., the serial number, the setting information, and a model) on the motor control device 60. A description is now given of equipment information and production propriety criterion information as examples of the information stored in the information storage unit 601.

The equipment information is information regarding the individual industrial equipment itself, and, on this occasion, includes at least propriety information regarding whether or not industrial equipment can be produced by using the setting information regarding this industrial equipment, or information for identifying the propriety information. According to this embodiment, a description is given of a case where the equipment information includes the propriety information. The propriety information takes a value indicating that the production is possible or a value indicating that the production is impossible. The information included in the equipment information is not limited to the above-mentioned example. The equipment information may include other information regarding the industrial equipment. In addition, the equipment information may include the serial number, a model, setting information (e.g., parameters and firmware), and additional specification information (e.g., with/without an option).

The production propriety criterion information includes information serving as a determination criterion when the production propriety determination unit 602 determines whether or not the production is possible. The determination criterion is whether or not the industrial equipment is predetermined industrial equipment, or whether or not the industrial equipment is in a predetermined state. For example, the production propriety criterion defines such a criterion that the industrial equipment can be produced if the industrial equipment is predetermined industrial equipment, and such a criterion that the industrial equipment can be produced if the industrial equipment is in a predetermined state.

On this occasion, the model of the motor control device is used as the determination criterion. The model is information indicating a type of the industrial equipment, and is represented as, for example, a symbol sequence of characters and numbers. On this occasion, the type represents a classification for aggregating pieces of industrial equipment common in handling of the industrial equipment, i.e., an operation and maintenance. For example, in the production propriety criterion information, models that can be produced, or models that cannot be produced are defined.

The production propriety determination unit 602 is implemented mainly by the control unit of the motor control device 60. The production propriety determination unit 602 is configured to determine whether or not industrial equipment (e.g., a new piece of industrial equipment to which a unit or entirety of the setting information regarding the motor control device 60 is set) can be produced by using the setting information regarding the industrial equipment based on the production propriety criterion information stored in the information storage unit 601. The production propriety determination unit 602 is configured to generate propriety information representing a determination result of the production propriety, and store the propriety information in the information storage unit 601. The propriety information takes a value indicating that the production is possible or a value indicating that the production is impossible. Therefore, for example, as a result of a change by the user in the setting information regarding the motor control device 60, the propriety of the production may change depending on the change.

According to this embodiment, the production propriety determination unit 602 is configured to determine the production propriety based on the model of the motor control device 60. The production propriety determination unit 602 is configured to produce the propriety information indicating that the production is possible when the model of the motor control device 60 is a model that can be produced, and produce the propriety information indicating that the production is impossible when the model of the motor control device 60 is a model that cannot be produced.

The propriety information may indicate that the production is impossible when the industrial equipment indicated by the equipment information is produced by using the setting information regarding another piece of industrial equipment. The production propriety determination unit 602 only needs to be configured to determine whether or not the industrial equipment is produced by using the setting information regarding another piece of industrial equipment based on the information stored in the information storage unit 601. For example, in a case where a specific model is assigned when the setting information regarding another piece of industrial equipment is used for the production, the production propriety determination unit 602 determines whether or not the model is the specific model.

[Functions Implemented by User Device]

The user device 50 includes an equipment information acquisition unit 501 and an authentication unit 502. The equipment information acquisition unit 501 is implemented mainly by the control unit of the user device 50. The equipment information acquisition unit 501 is configured to acquire the equipment information regarding the industrial equipment. According to this embodiment, a description is given of a case where the equipment information acquisition unit 501 is configured to acquire the equipment information stored in the information storage unit 601 of the motor control device 60, but the equipment information acquisition unit 501 may be configured to generate the equipment information based on the information stored in the information storage unit 601 of the motor control device 60.

The authentication unit 502 is implemented mainly by the control unit of the user device 50. The authentication unit 502 is configured to transmit a user ID and a password input by the user to the industrial equipment production system S, and acquire an authentication result from the industrial equipment production system S. The authentication method itself is not limited to the method of using the user ID and the password, and publicly known various methods can be applied as the authentication method.

[Functions Implemented by Production Permission Server]

The production permission server 10 includes an information storage unit 101, an authentication permission unit 102, a production propriety acquisition unit 103, a user information acquisition unit 104, a supply propriety acquisition unit 105, and a permission unit 106.

The information storage unit 101 is implemented mainly by the storage unit 12. The information storage unit 101 is configured to store various pieces of information regarding the pieces of industrial equipment and the users. A description is now given of authentication information and user information as examples of the information stored in the information storage unit 101. The authentication information is information required for the user to log in to the production permission server 10, and is information required to authenticate the user. On this occasion, a combination of the user ID and the password of each of the users corresponds to the authentication information.

The user information includes belonging information indicating a region to which the user belongs. On this occasion, the region to which the user belongs is information sufficient to identify the regional system 40 for managing this user. When the regional system 40 simply manages a certain region, e.g., a country, in which the regional system 40 exists, the belonging information only needs to indicate the region, i.e., the country. Alternatively, the belonging information may be information indicating a region to which the user indirectly belongs. For example, the belonging information may be information indicating a group to which the user belongs. The group is information indicating an attribute of the user, and is information indicating an organization, e.g., a company, or a section of the company to which the user belongs. When the group is associated with a specific regional system 40, the region to which this user belongs can be known from the information indicating the group. The user information may include personal information, e.g., the user ID and a user name, as well as the belonging information.

The authentication permission unit 102 is implemented mainly by the control unit 11. The authentication permission unit 102 is configured to carry out authentication processing for authenticating the user. On this occasion, the authentication permission unit 102 is configured to compare the user ID and the password acquired from the authentication unit 502 of the user device 50 and a user ID and a password stored in the information storage unit 101 with each other for the authentication.

The production propriety acquisition unit 103 is implemented mainly by the control unit 11. The production propriety acquisition unit 103 is configured to use, based on the equipment information regarding the industrial equipment, the setting information regarding the industrial equipment to acquire a determination result indicating whether or not the industrial equipment can be produced. According to this embodiment, the production propriety acquisition unit 103 is configured to acquire the propriety information included in the equipment information transmitted by the equipment information acquisition unit 501 of the user device 50. In other words, the production propriety acquisition unit 103 is configured to acquire the propriety information stored in or produced by the industrial equipment.

The user information acquisition unit 104 is implemented mainly by the control unit 11. The user information acquisition unit 104 is configured to acquire user information regarding the authenticated user. According to this embodiment, the user information acquisition unit 104 is configured to acquire the user information stored in the information storage unit 101, but may be configured to acquire user information stored in an external computer, e.g., the equipment management server 20.

The supply propriety acquisition unit 105 is implemented mainly by the control unit 11. The information propriety acquisition unit 105 is configured to acquire a result of determining whether or not industrial equipment produced by using the setting information can be supplied to the user based on the user information (on this occasion, the belonging information included in the user information) on the user. According to this embodiment, the supply propriety determination processing is carried out by the regional system 40. Thus, the supply propriety acquisition unit 105 is configured to identify the regional system 40 that is requested to carry out this determination processing based on the belonging information. The supply propriety acquisition unit 105 is configured to transmit the request for the determination processing along with the model of the industrial equipment to the identified regional system 40 (i.e., regional system 40 that is the request destination of the determination processing). In other words, the supply propriety acquisition unit 105 is configured to acquire a determination result from the regional system 40 to which the user belongs.

Moreover, for example, the supply propriety acquisition unit 105 may be configured to request the regional system 40 to which the user belongs to carryout the determination processing when the production propriety acquisition unit 103 acquires a determination result indicating that the production is possible. In other words, the supply propriety acquisition unit 105 may be configured not to request the regional system 40 to carryout the determination processing when the production propriety acquisition unit 103 acquires the determination result indicating that the production is impossible.

The permission unit 106 is implemented mainly by the control unit 11. The permission unit 106 is configured to permit, based on the determination result acquired by the production propriety acquisition unit 103 and the determination result acquired by the supply propriety acquisition unit 105, the production of the industrial equipment that uses the setting information. According to this embodiment, the permission unit 106 is configured to permit issuance of identification information for producing the industrial equipment by using the setting information.

The identification information is information associated with the setting information regarding the industrial equipment. In other words, the identification information may be considered as information for identifying setting information to be set to the industrial equipment to be produced. When the user uses the setting information regarding certain industrial equipment to produce another piece of industrial equipment, the user needs to hold identification information associated with this setting information. Whether or not the user holds the identification information may be determined by the industrial equipment production system S or manually. When the user is confirmed to hold the identification information, the industrial equipment is produced by using the setting information associated with this identification information.

The permission unit 106 is configured to permit the production of the industrial equipment that uses the setting information when the production propriety acquisition unit 103 acquires the determination result indicating that the production is possible, and when the supply propriety acquisition unit 105 acquires the determination result indicating that the supply is possible. In other words, the permission unit 106 is configured to inhibit the production of the industrial equipment that uses the setting information when the production propriety acquisition unit 103 acquires the determination result indicating that the production is impossible, or when the supply propriety acquisition unit 105 acquires the determination result indicating that the supply is impossible.

[Functions Implemented by Equipment Management Server]

The equipment management server 20 includes an identification information issuance unit 201, a registration unit 202, and an information storage unit 203. The identification information issuance unit 201 is implemented mainly by the control unit of the equipment management server 20. The identification information issuance unit 201 is configured to issue the identification information when the permission unit 106 permits the issuance of the identification information. The identification information issuance unit 201 is configured to issue an identification number under a predetermined issuance rule. For example, the identification information issuance unit 201 is configured to issue a symbol sequence (e.g., numbers and characters) issued based on a predetermined symbol sequence issuance rule as the identification information.

The registration unit 202 is implemented mainly by the control unit of the equipment management server 20. The registration unit 202 is configured to associate the identification information issued by the identification information issuance unit 201 with the setting information, and register the associated identification information to the information storage unit 203. For example, the registration unit 202 may be configured to associate the identification information with the user ID that instructs the issuance of the identification number and the serial number of the motor control device 60, and register the associated identification information to the information storage unit 203.

The information storage unit 203 is implemented mainly by the storage unit of the equipment management server 20. The information storage unit 203 is configured to store the identification information issued by the identification information issuance unit 201. The identification information stored in the information storage unit 203 is notified to the user. When the industrial equipment is to be produced, and the notified identification information is held by the user, the setting information associated with the identification information can be used to produce new industrial equipment.

[Functions Implemented by Regional System]

The regional system 40 includes an information storage unit 401 and a supply propriety determination unit 402. The information storage unit 401 is implemented mainly by the storage unit of the regional system 40. The information storage unit 401 is configured to store various pieces of information regarding pieces of industrial equipment that can be supplied in the region corresponding to the regional system 40. A description is now given of supply propriety criterion information as an example of the information stored in the information storage unit 401.

The supply propriety criterion information includes information serving as a determination criterion when the supply propriety determination unit 402 determines whether or not the supply is possible. The determination criterion is whether or not the industrial equipment is predetermined industrial equipment. For example, the supply propriety criterion information defines that industrial equipment can be produced if the industrial equipment is the predetermined industrial equipment. On this occasion, the model of the motor control device 60 is used as the determination criterion. Therefore, the models of the motor control device 60 that can be supplied in the region corresponding to the regional system 40 are defined in the supply propriety criterion information.

The supply propriety determination unit 402 is implemented mainly by the control unit of the regional system 40. The supply propriety determination unit 402 is configured to determine whether or not the industrial equipment produced by using the setting information can be supplied to the user based on the supply propriety criterion information stored in the information storage module 401. According to this embodiment, the supply propriety determination unit 402 is configured to determine whether or not the industrial equipment of this model can be supplied based on the model of the industrial equipment. The production propriety determination unit 602 is configured to generate information indicating a result of the determination of whether or not the supply is possible, and transmit the generated information to the supply propriety acquisition unit 105 of the production propriety server 10.

[Processing Carried Out in Industrial Equipment Production System]

Figure 4:
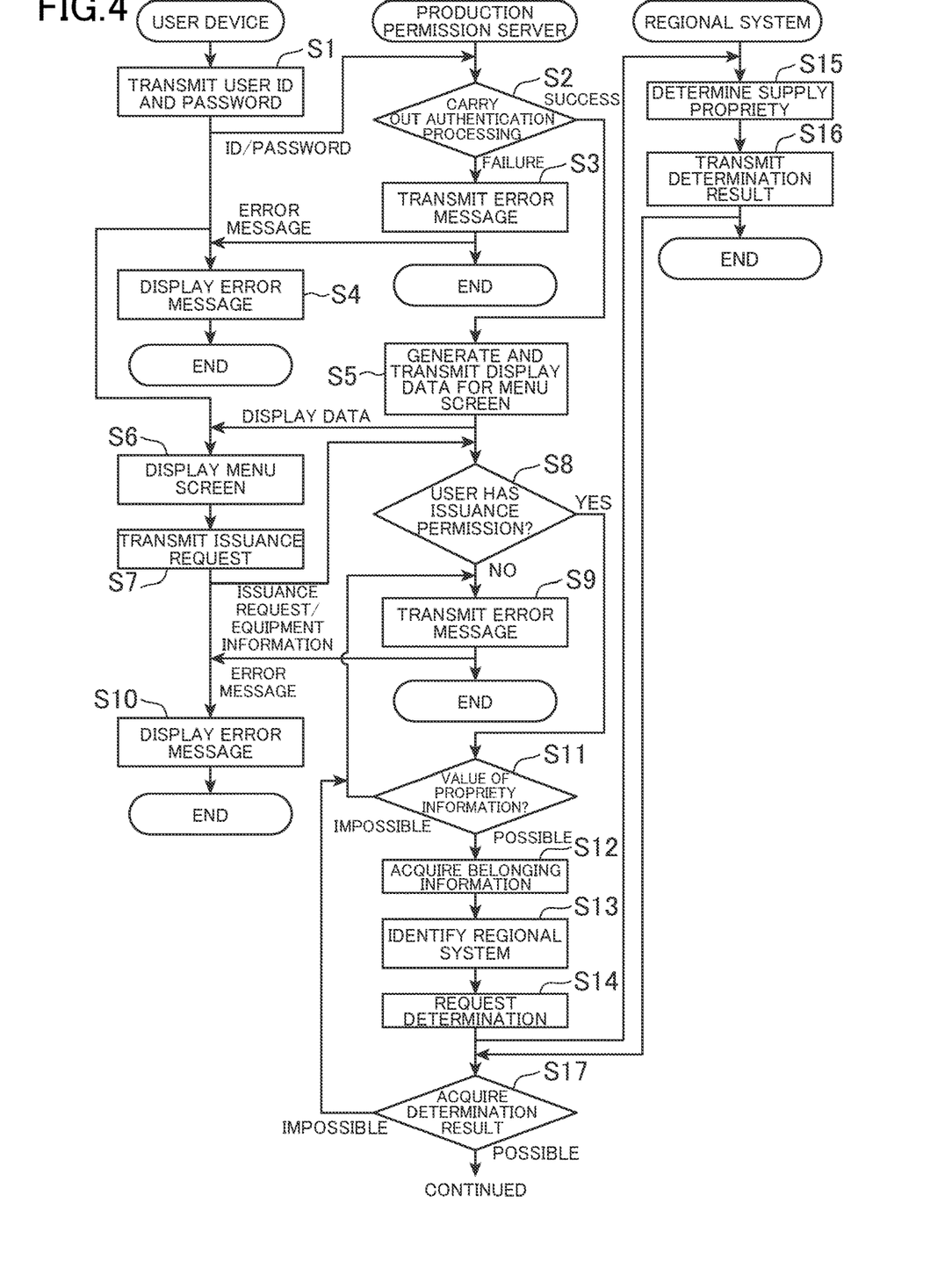
FIG. 4 is a flowchart for illustrating an example of processing carried out by an industrial equipment production system S.
Figure 5:
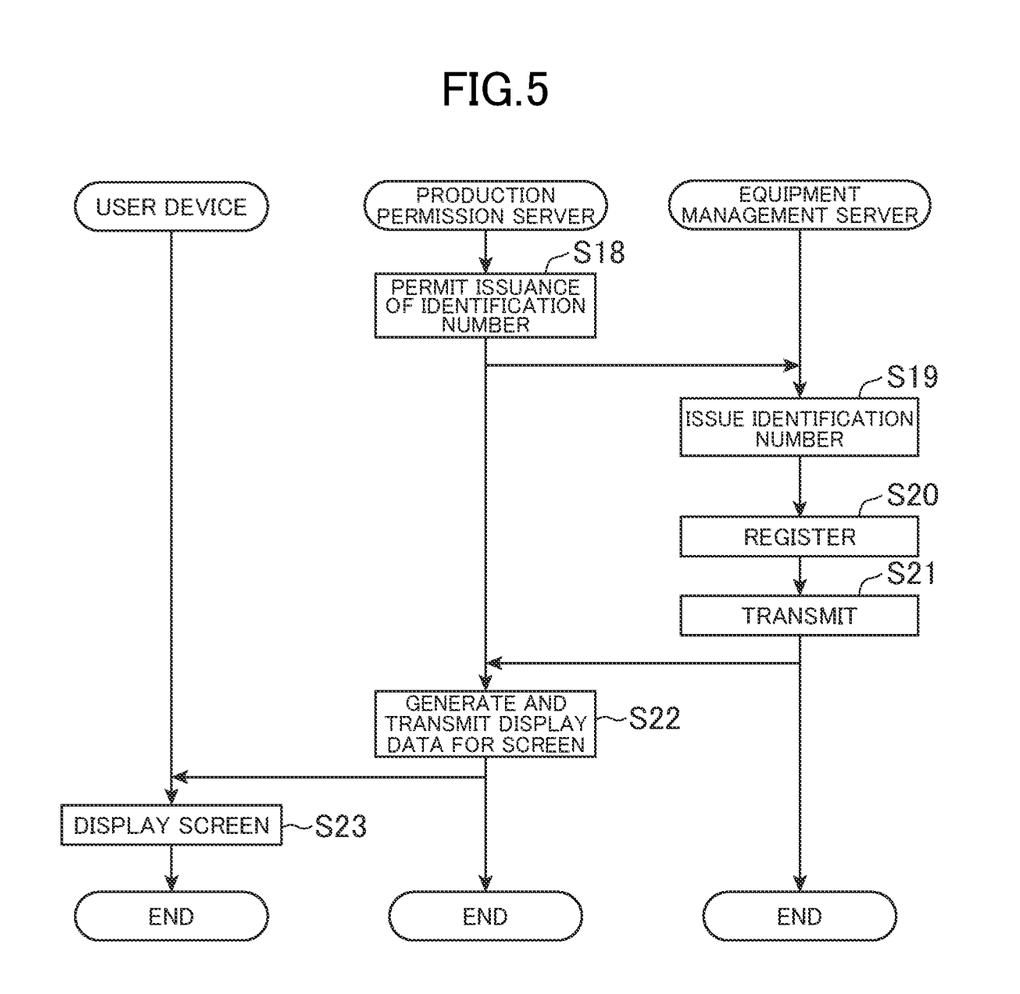
FIG. 5 is a flowchart for illustrating the example of the processing carried out by the industrial equipment production system S.

FIG. 4 and FIG. 5 are flowcharts for illustrating an example of processing carried out by the industrial equipment production system S. The processing described below is carried out by the production permission server 10, the equipment management server 20, the regional system 40, and the user device 50 executing respective programs. The respective functional blocks are implemented as a result of the execution of this processing.

As illustrated in FIG. 4, first, the control unit of the user device 50 transmits the user ID and the password input by the user from the operation unit to the production permission server 10 (S1). When the processing in Step S1 is carried out, a screen for logging in to the industrial equipment production system S is displayed on the display unit of the user device 50. In Step S1, the control unit of the user device 50 transmits the user ID and the password input on this screen.

When the control unit 11 of the production permission server 10 receives the user ID and the password, the control unit 11 carries out the authentication processing (S2). In Step S2, the production permission server 10 first determines whether or not the user ID input by the user exists in the storage unit 12. When the user ID exists in the storage unit 12, the production permission server 10 determines whether or not the password associated with this user ID and the password input by the user match each other.

When the authentication fails ("failure" in Step S2), the control unit 11 of the production permission server 10 transmits an error message indicating that the authentication has failed to the user device 50 (S3). When the control unit of the user device 50 receives the error message, the control unit displays the error message on the display unit (S4), and this processing is finished. On the other hand, when the authentication succeeds ("success" in Step S2), the control unit 11 of the production permission server 10 generates display data for a predetermined menu screen, and transmits the display data to the user device 50 (S5). The menu screen is a screen for the user to use services provided by the industrial equipment production system S, and the user can request the issuance of the identification number from the menu screen.

When the control unit of the user device 50 receives the display data, the control unit displays the menu screen on the display unit (S6). When the user uses the operation unit to carry out a predetermined operation on the menu screen, the control unit of the user device 50 acquires the equipment information stored in the storage unit of the motor control device 60, and transmits the issuance request for the identification information along with this equipment information to the production permission server 10 (S7). The equipment information may be acquired from the motor control device 60 in advance to be stored in the storage unit of the user device 50.

When the control unit 11 of the production permission server 10 receives the equipment information and the issuance request, the control unit 11 determines whether or not the user who has made the issuance request is a user holding issuance permission (S8). User IDs holding the issuance permission for the identification information are defined in advance in the storage unit 12, and in Step S8, the production permission server 10 determines whether or not the user ID that has made the issuance request is a user ID holding the issuance permission.

When the user is not a user holding the issuance permission ("N" in Step S8), the control unit 11 of the production permission server 10 transmits an error message indicating that the identification number cannot be issued to the user device 50 (S9). When the control unit of the user device 50 receives the error message, the control unit displays the error message on the display unit (S10), and this processing is finished.

On the other hand, when the user is a user holding the issuance permission ("Y" in Step S8), the control unit 11 of the production permission server 10 refers to the propriety information included in the equipment information (S11). When the propriety information indicates the value that the production is impossible ("impossible" in Step S11), the processing proceeds to Step S9. In this case, the issuance of the identification number is not permitted, and an error message indicating that the identification number cannot be issued is thus displayed on the user device 50 while the regional system 40 does not carry out the supply propriety determination processing.

On the other hand, when the propriety information indicates the value that the production is possible ("possible" in Step S11), the control unit 11 of the production permission server 10 acquires the belonging information regarding the user stored in the storage unit 12 (S12). In Step S12, the control unit 11 of the production permission server 10 acquires the belonging information associated with the user ID. The belonging information may be stored in the equipment management server 20. In this case, in Step S12, the production permission server 10 transmits a request to acquire the belonging information along with the user ID to the storage unit of the equipment management server 20, and acquires the belonging information associated with the user ID from the equipment management server 20.

The control unit 11 of the production permission server 10 identifies the regional system 40 that is to be requested to carry out the supply propriety determination processing out of the plurality of regional systems 40 based on the belonging information acquired in Step S12 (S13). Information (e.g., an IP address and a server name) indicating the regional system 40 corresponding to each of the regions is stored in the storage unit in advance, and in Step S13, the production permission server 10 identifies the regional system 40 corresponding to the region indicated by the belonging information based on this information.

The control unit 11 of the production permission server 10 requests the regional system 40 identified in Step S13 to carry out the supply propriety determination processing along with the model included in the equipment information (S14). On this occasion, a description is given of the case where the model of the industrial equipment is included in the equipment information, but the production permission server 10 may be configured to inquire the equipment management server 20 to acquire the model.

The control unit of the regional system 40 that is requested to carry out the determination processing determines whether or not the industrial equipment can be supplied based on the received model of the industrial equipment (S15). Information indicating the models of the industrial equipment that can be supplied is stored in the storage unit of the regional system 40, and in Step S15, the regional system 40 determines whether or not the industrial equipment of the received model can be supplied in the region corresponding to the regional system 40 based on this information.

The control unit of the regional system 40 transmits a determination result in Step S15 to the production permission server 10 (S16). In Step S16, the control unit of the regional system 40 transmits a determination result indicating that the supply is possible, or a determination result indicating that the supply is impossible. The production permission server 10 acquires the determination result from the regional system 40 (S17). When the determination result that the supply is impossible is acquired ("impossible" in Step S17), the processing proceeds to Step S9. In this case, the production permission server 10 does not permit the issuance of the identification information.

On the other hand, when the determination result indicating that the supply is possible is acquired ("possible" in Step S17), the processing proceeds to FIG. 5, and the control unit 11 of the production permission server 10 permits the issuance of the identification number (S18). In Step S18, the control unit 11 transmits the issuance request for the identification number along with the user ID and the serial number included in the equipment information to the equipment management server 20.

When the control unit of the equipment management server 20 receives the issuance request, the control unit issues the identification number under the predetermined issuance rule (S19). For example, the issuance rule of the identification number is defined such that the identification number to be issued is not the same as identification numbers already issued.

The control unit of the equipment management server 20 associates the identification number issued in Step S19 with the setting information, the user ID, and the serial number, and registers the identification number to the storage unit (S20). The equipment management server 20 may be configured to acquire the setting information from the production permission server 10. In this case, the setting information may be included in the equipment information.

The control unit of the equipment management server 20 transmits the identification information issued in Step S19 to the production permission server 10 (S21). When the control unit of the production permission server 10 receives the identification number, the control unit 11 generates display data for a screen including this identification number, and transmits the display data to the user device 50 (S22). When the user device 50 receives the display data, the user device 50 displays the screen on the display unit (S23), and this processing is finished. Subsequently, the user can use the setting information associated with this identification number to instruct the production of the industrial equipment.

With the above-mentioned industrial equipment production system S, the equipment information regarding the industrial equipment and the information regarding the user are considered to permit the production of the industrial equipment that uses the setting information regarding the industrial equipment. As a result, the propriety of the production of the industrial equipment that uses the setting information can be independently set for each of pieces of industrial equipment and each of the users. Particularly in the field of the industrial equipment, know-how of the user is accumulated in the setting information adjusted by the user, and in some pieces of industrial equipment, when the setting information held by the industrial equipment set in various ways can be used to reproduce industrial equipment having the same setting information, the know-how may inappropriately leak. Therefore, the know-how of the user can be prevented from leaking by determining and controlling the production propriety by considering the equipment information regarding the industrial equipment. Further, in the field of the industrial equipment, the region and the application in which the industrial equipment is used vary depending on the user, and industrial equipment that the user wants may not be sold, or may not preferably be used in the region of the user. Thus, industrial equipment optimal for the user can be produced by determining the supply propriety by considering the information regarding the user.

Moreover, the result of determining the supply propriety is acquired based on the belonging information indicating the region to which the user belongs, and the determination result of the supply propriety can thus be changed depending on the region to which the user belongs. Particularly in the field of the industrial equipment, the industrial equipment that can be supplied changes greatly depending on the region, and the production of the industrial equipment reflecting a situation specific to the region can thus be made by considering the region to which the user belongs.

Moreover, the regional system 40 carries out the supply propriety determination processing, and the determination relating to the user can thus be assigned to the regional system 40. The equipment information regarding the industrial equipment can be managed by the industrial equipment production system S side, while matters relating to the respective regions can be managed on the regional system 40 side. As a result, each of the regions does not need to be individually managed on the industrial equipment production system. S side, and a maintenance cost for a database and the like can thus be reduced. Further, a processing load imposed on the industrial equipment production system S side can be decreased by causing the regional system 40 to which the user belongs to carry out the determination processing for the supply propriety in the region corresponding to this regional system 40. Particularly in the field of the industrial equipment, information regarding various pieces of industrial equipment exists, and maintenance of the information is very time-consuming. Thus, more efficient system operation can be implemented by distributing this maintenance to the respective regions.

Moreover, when the determination result of the production propriety is negative, the subsequent determination processing is no longer necessary, and thus useless determination processing does not need to be carried out. As a result, useless communication to/from the regional system 40 does not occur, and a communication amount is thus decreased.

Moreover, the industrial equipment production system S only needs to refer to the propriety information to acquire the determination result by storing or generating the propriety information regarding the industrial equipment side. As a result, on the industrial equipment production S side, a complex determination logic for the production propriety does not need to be managed, and a database required for the determination does not thus need to be managed. Particularly in the field of the industrial equipment, the information regarding various pieces of industrial equipment needs to be maintained. Thus, when the determination processing for the production propriety is carried out on the industrial equipment side, complex maintenance does not need to be carried out on the industrial equipment production system S side.

Moreover, the setting information regarding industrial equipment produced by using the setting information regarding another piece of industrial equipment can be prevented from being used to produce yet another piece of industrial equipment, and duplication can thus be prevented more effectively. Particularly in the field of the industrial equipment, the setting information corresponds to the know-how of the user, and the know-how can thus be effectively prevented from leaking.

Moreover, the identification information is issued only when the production of the industrial equipment that uses the setting information is permitted, and the identification information can thus be prevented from uselessly being issued. As a result, the management of the identification information is facilitated.

Modified Examples

According to the embodiment, the case in which the motor control device 60 is configured to carry out the production propriety processing and the regional system 40 is configured to carry out the supply propriety determination processing is exemplified, but the computers configured to carry out the production propriety determination processing and the supply propriety determination processing are not limited to those in this case. The industrial equipment production system S only needs to acquire the respective determination results of the production propriety determination processing and the supply propriety determination processing.

[Modified Example for Case where Production Permission Server Includes Production Propriety Determination Unit]

Figure 6:
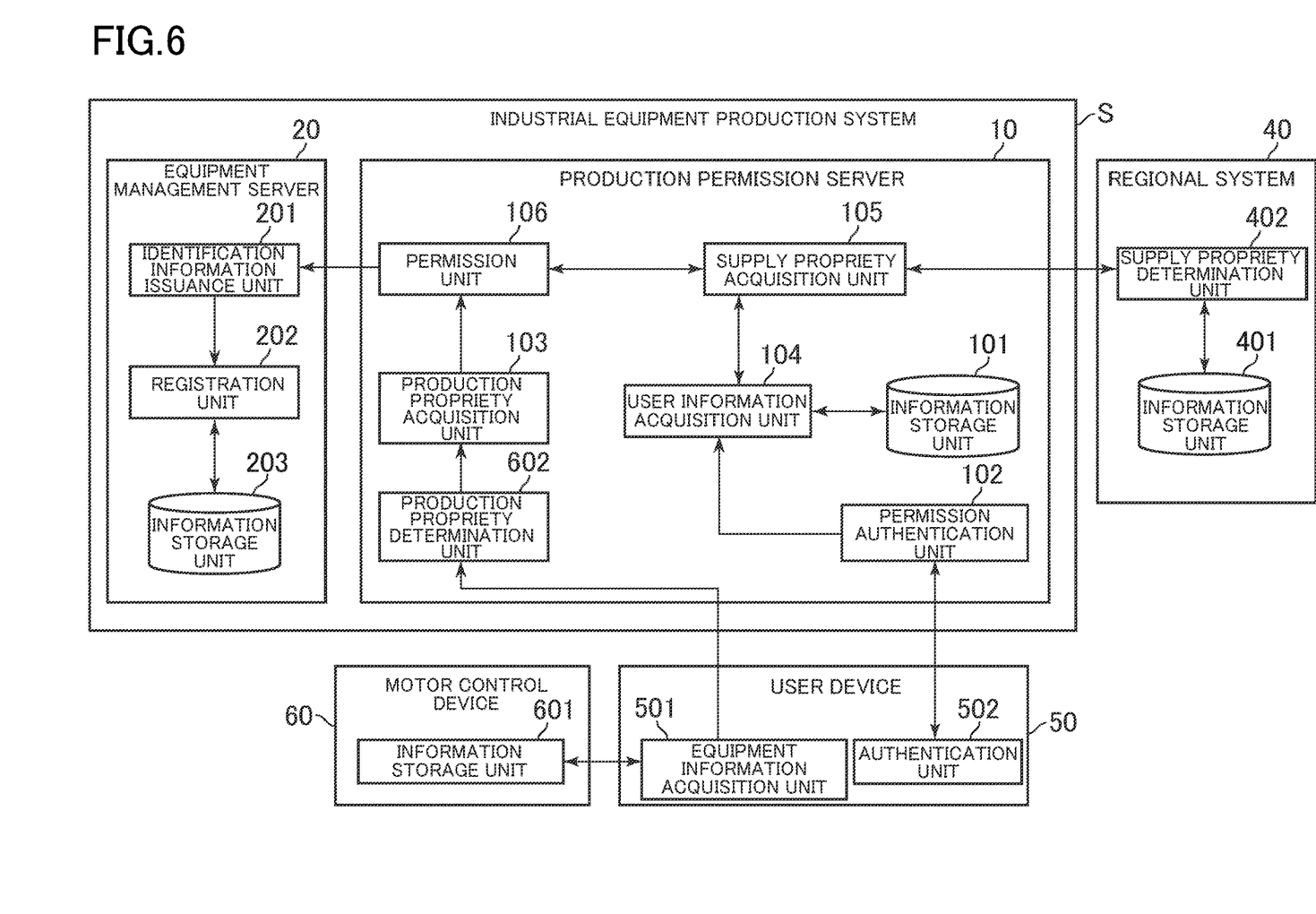
FIG. 6 is a functional block diagram for illustrating functions implemented in a modified example of the present invention.

For example, the production permission server 10 may be configured to carry out the production propriety determination processing. FIG. 6 is a functional block diagram of this modified example. As illustrated in FIG. 6, the production permission server 10 includes the production propriety determination unit 602, and the production propriety determination unit 602 is implemented mainly by the control unit 11 of the production permission server 10. In this case, the production propriety criterion information may be stored in the information storage unit 101 of the production permission server 10, or the production permission server 10 may be configured to acquire the production propriety criterion information stored in an external computer. The determination method itself carried out by the production propriety determination unit 602 is the same as the method described in the embodiment, and a description thereof is therefore omitted. The production propriety determination unit 602 is configured to generate the propriety information, and thus, according to this modified example, the equipment information does not include the propriety information.

According to this modified example, the production propriety determination unit 602 may be configured to determine, based on the equipment information, whether or not the industrial equipment indicated by the equipment information is produced by using the setting information regarding another piece of industrial equipment. In this case, the equipment information includes information indicating whether or not the industrial equipment indicated by the equipment information is produced by using the setting information regarding another piece of industrial equipment or information for identifying this information. The production propriety determination unit 602 is configured to determine that the production is possible when it is determined that the industrial equipment indicated by the equipment information is not produced by using the setting information regarding another piece of industrial equipment, and determine that the production is impossible when it is determined that the industrial equipment indicated by the equipment information is produced by using the setting information regarding another piece of industrial equipment.

According to this modified example, the determination processing for the production propriety does not need to be carried out on the industrial equipment production system S side, and thus a determination logic does not need to be built into the industrial equipment side. In addition, for example, when the determination criterion for the production propriety changes, the industrial equipment production system. S side can be adapted to the change. In other words, a change in the determination logic and the like do not need to be carried out on the industrial equipment side. Moreover, the setting information regarding industrial equipment produced by using the setting information regarding another piece of industrial equipment can be prevented from being used to produce yet another piece of industrial equipment, and duplication can thus be prevented more effectively.

[Modified Example for Case where Production Permission Server Includes Supply Propriety Determination Unit]

Figure 7:
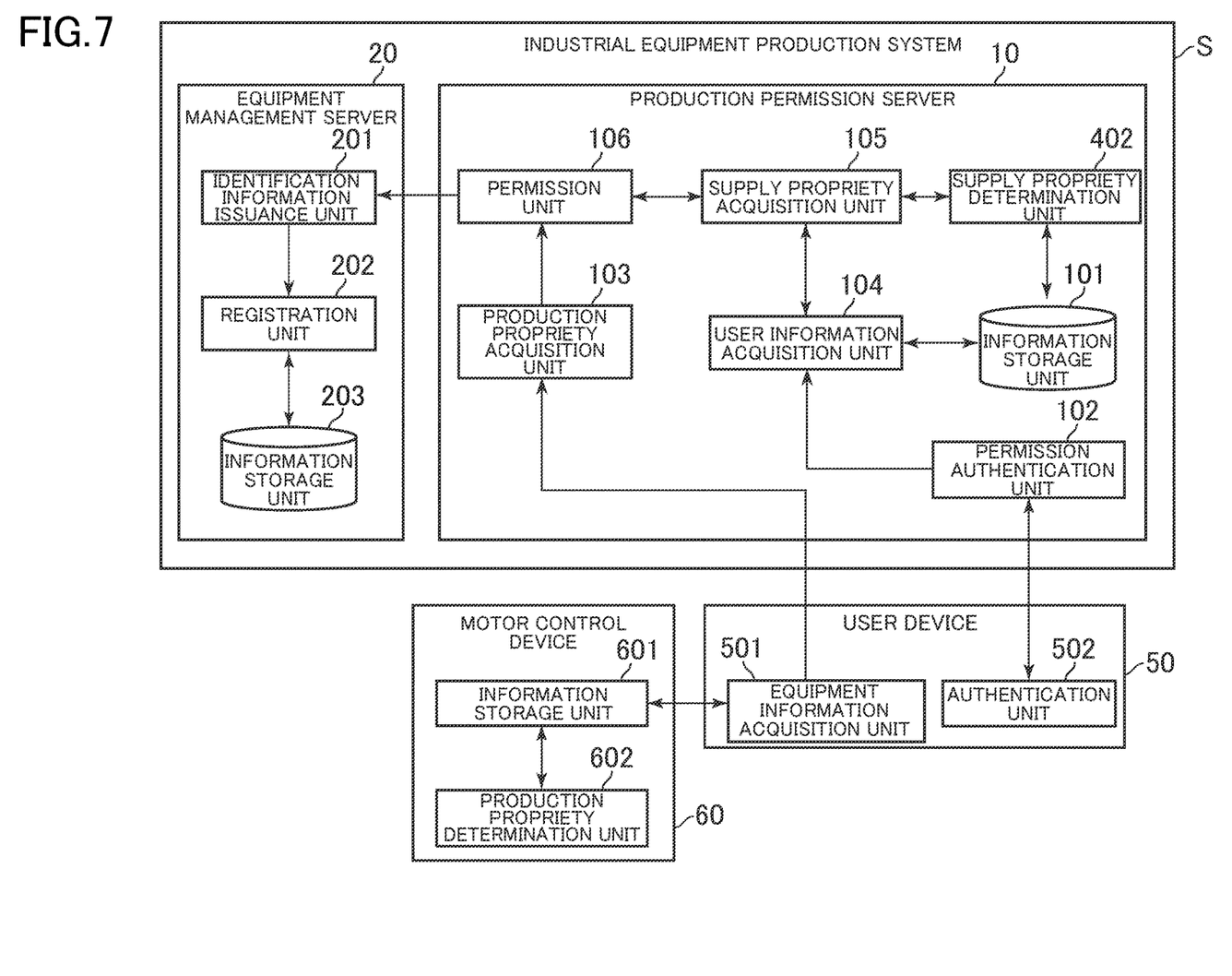
FIG. 7 is a functional block diagram for illustrating functions implemented in another modified example of the present invention.

For example, the production permission server 10 may be configured to carry out the supply propriety determination processing. FIG. 7 is a functional block diagram of this modified example. As illustrated in FIG. 7, in this case, the production permission server 7 includes the supply propriety determination unit 402, and the supply propriety determination unit 402 is implemented mainly by the control unit 11 of the production permission server 10. In this case, the supply propriety criterion information may be stored in the information storage unit 101 of the production permission server 10, or the production permission server 10 may be configured to acquire the supply propriety criterion information stored in an external computer. The determination method itself carried out by the supply propriety determination unit 402 is the same as the method described in the embodiment, and a description thereof is therefore omitted.

According to this modified example, in the industrial equipment production system S, the necessity for the inquiry to the regional system 40 is eliminated by carrying out the supply propriety determination processing in the industrial equipment production system S. Further, the production permission server 10 may be configured to carry out both the production propriety determination processing and the supply propriety determination processing by combining the modified examples with each other. In this way, the logics and the required information for carrying out the production propriety determination processing and the supply propriety determination processing can be managed in a unified manner.

[Modified Example for Case where Regional System Includes Production Propriety Determination Unit]

Figure 8:
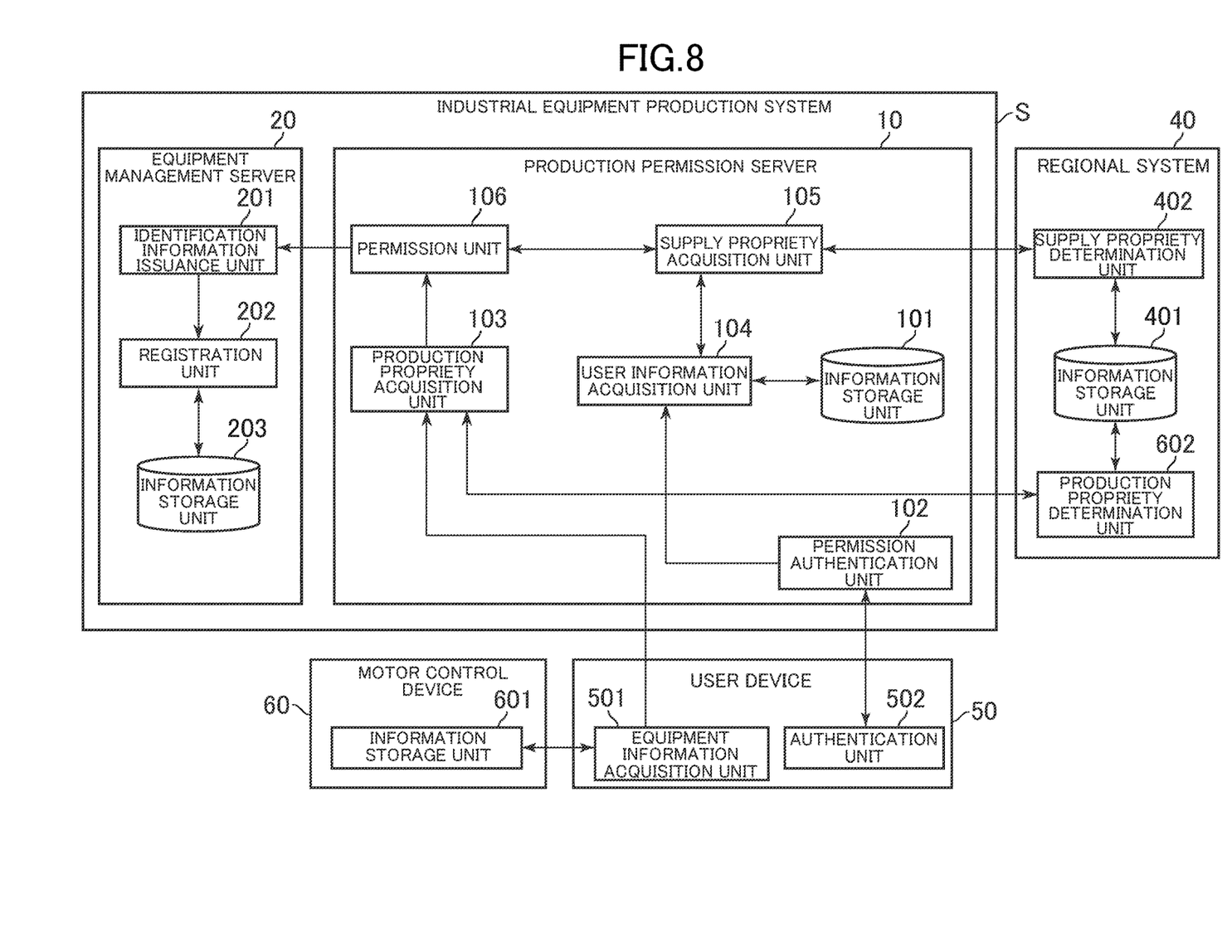
FIG. 8 is a functional block diagram for illustrating functions implemented in still another modified example of the present invention.

For example, the regional system 40 may be configured to carry out the production propriety determination processing. FIG. 8 is a functional block diagram of this modified example. As illustrated in FIG. 8, in this case, the regional system 40 includes the production propriety determination unit 602, and the production propriety determination unit 602 is implemented mainly by the control unit of the regional system 40. In this case, the production propriety criterion information may be stored in the information storage unit 401 of the regional system 40, or the regional system 40 may be configured to acquire the production propriety criterion information stored in an external computer. The determination method itself carried out by the production propriety determination unit 602 is the same as the method described in the embodiment and the above-mentioned modified example, and a description thereof is therefore omitted. According to this modified example, the production propriety determination unit 602 is configured to acquire the model of the industrial equipment from the production propriety acquisition unit 103 or the equipment information acquisition unit 501, thereby carrying out the production propriety determination processing. The production propriety determination unit 602 of the regional system 40 is configured to transmit the determination result of the production propriety determination to the production permission server 10.

According to this modified example, a load imposed by maintaining the information and a load imposed by carrying out the determination processing can be alleviated on the industrial equipment production system S side by carrying out the maintenance for the information and the determination processing on the regional system 40.

Other Modified Examples

Moreover, for example, the regional system 40 may be included in the industrial equipment production system S. Similarly, the plant system 30, the user device 50, and the motor control device 60 may be included in the industrial equipment production system S.

Moreover, for example, the method of determining the production propriety by the production propriety determination unit 602 is not limited to the above-mentioned example. For example, the production propriety determination unit 602 may be configured to determine the production propriety based on the serial number of the industrial equipment. In this case, the production propriety determination unit 602 may be configured to determine the production propriety based on the model associated with the serial number, or may be configured to determine the production propriety based on whether or not the serial number is a predetermined number. Moreover, for example, the production propriety determination unit 602 may be configured to determine the production propriety based on additional specification information regarding the industrial equipment. In this case, the production propriety determination unit 602 is configured to determine the production propriety based on whether or not an option for the industrial equipment exists. In addition, for example, the production propriety determination unit 602 may be configured to determine the production propriety based on the setting information regarding the industrial equipment. In this case, the production propriety determination unit 602 is configured to determine the production propriety based on whether or not the setting information is predetermined setting (e.g., whether or not a parameter is a predetermined parameter, or whether or not a specification of firmware is a predetermined specification).

Moreover, for example, a description is given of the case where the equipment information includes the propriety information, but the determination result of the production propriety determination processing only needs to be acquired based on the equipment information. For example, the production propriety acquisition unit 103 may be configured to acquire the determination result of the production propriety determination processing based on the model included in the equipment information.

Moreover, for example, the method of determining the supply propriety by the supply propriety determination unit 402 is not limited to the above-mentioned example. For example, the supply propriety determination unit 402 may be configured to determine whether or not the industrial equipment is industrial equipment that can be supplied in the region (or the regional system 40) to which the user belongs.

Moreover, for example, a description is given of the case where the permission unit 106 is configured to permit the issuance of the identification number, thereby permitting the production of the industrial equipment, but the permission of the production of the industrial equipment only needs to be identifiable in the industrial equipment production system S, and the method of permitting the production of the industrial equipment by the permission unit 106 is not limited to this method.

Moreover, for example, a description is given of the case where the industrial equipment production system S includes the plurality of server computers, but the industrial equipment production system S may be implemented by one server computer. Moreover, for example, the industrial equipment production system S only needs to carry out the processing up to the permission for the production, and as in the case of the embodiment, the industrial equipment production system S may be independent of the plant system 30 and may not involve the actual production, or may manage the production of the industrial equipment.

Moreover, the embodiment described above is given as a specific example, and is not to limit the invention disclosed herein to the very configuration and data storage examples of the specific example. A person skilled in the art may make various modifications to the disclosed embodiment with regard to, for example, the shapes and numbers of physical components, data structures, and execution orders of processing. It is to be understood that the technical scope of the invention disclosed herein encompasses such modifications. In other words, it should be understood by those skilled in the art that various modifications, combinations, sub-combinations and alterations may occur depending on design requirements and other factors insofar as they are within the scope of the appended claims or equivalents thereof.

The invention claimed is:

1. An industrial equipment procurement system, comprising:
    a production permission server including a central processing unit; and
    a regional system server including a central processing unit;
    the production permission server and the regional system server being able to communicate with each other over a network;
    the production permission server is configured to:
        receive from a user an issuance request identification information which is based on setting information for a first piece of industrial equipment, the first piece of industrial equipment configured to control at least one first motor, the identification information being information for procuring a second piece of industrial equipment which controls at least one second motor;
        determine whether procurement possibility information indicates that a procurement of the second piece of industrial equipment is possible or impossible when the issuance request is received, wherein the procurement possibility information is stored in the first piece of industrial equipment;
    the regional system server is configured to:
        determine a supply possibility for the second piece of industrial equipment based on user information regarding the user, when the issuance request is received;
    wherein the production permission server is further configured to:
        permit a procurement of the second piece of industrial equipment based on the determination result of the procurement possibility and the determination result of the supply possibility;
        issue the identification information when the procurement of the second piece of industrial equipment is permitted; and
        not issue the identification information when the procurement of the second piece of industrial equipment is not permitted;
    wherein the user adjusts the setting information for the first piece of industrial equipment to control the at least one first motor on a user device.

2. The industrial equipment procurement system according to claim 1, wherein:
    the user information comprises:
    belonging information indicating a region to which the user belongs; and
    the regional system server determines the supply possibility based on the belonging information.

3. The industrial equipment procurement system according to claim 2, wherein the regional system server is for a region to which the user belongs.

4. The industrial equipment procurement system according to claim 1, wherein:
    the first industrial equipment stores or produces the setting information; and
    the production permission server acquires the procurement possibility information stored in or produced by the first industrial equipment.

5. The industrial equipment procurement system according to claim 4, wherein the production permission server writes procurement possibility information that indicates the procurement is impossible into the first industrial equipment if the first industrial equipment is procured by using setting information of third industrial equipment.

6. The industrial equipment procurement system according to claim 1, wherein the production permission server writes procurement possibility information that indicates the procurement is impossible into a server if the first industrial equipment is procured by using setting information of third industrial equipment.

7. An industrial equipment procurement method, comprising:
    receiving, at a production permission server, from a user an issuance request containing identification information which is based on setting information for a first piece of industrial equipment, the first piece of industrial equipment configured to control at least one first motor, the identification information being information for procuring a second piece of industrial equipment which controls at least one second motor;
    determining, by the production permission server, whether procurement possibility information indicates that a procurement of the second piece of industrial equipment is possible or impossible when the issuance request is received, wherein the procurement possibility information is stored in the first piece of industrial equipment;
    determining, by a regional system server, a supply possibility for the second piece of industrial equipment is suppliable to the user based on user information regarding the user, when the issuance request is received;
    permitting, by the production permission server, a procurement of the second piece of industrial equipment based on the determination result of the procurement possibility and the determination result of the supply possibility;
    issuing, by the production permission server, the identification information when the procurement of the second piece of industrial equipment is permitted;
    not issuing, by the production permission server, the identification information when the procurement of the second industrial piece of equipment is not permitted; and
    wherein the user adjusts the setting information for the first piece of industrial equipment to control the at least one first motor on a user device.

* * * * *